Jan. 15, 1963  E. S. HAWKINS  3,074,056
SYSTEM FOR LARGE-AREA DISPLAY OF PICTORIAL
AND ALPHA-NUMERIC INFORMATION
Filed March 28, 1960  6 Sheets-Sheet 1

INVENTOR.
Eugene S. Hawkins
BY
Gust & Irish
Attorneys.

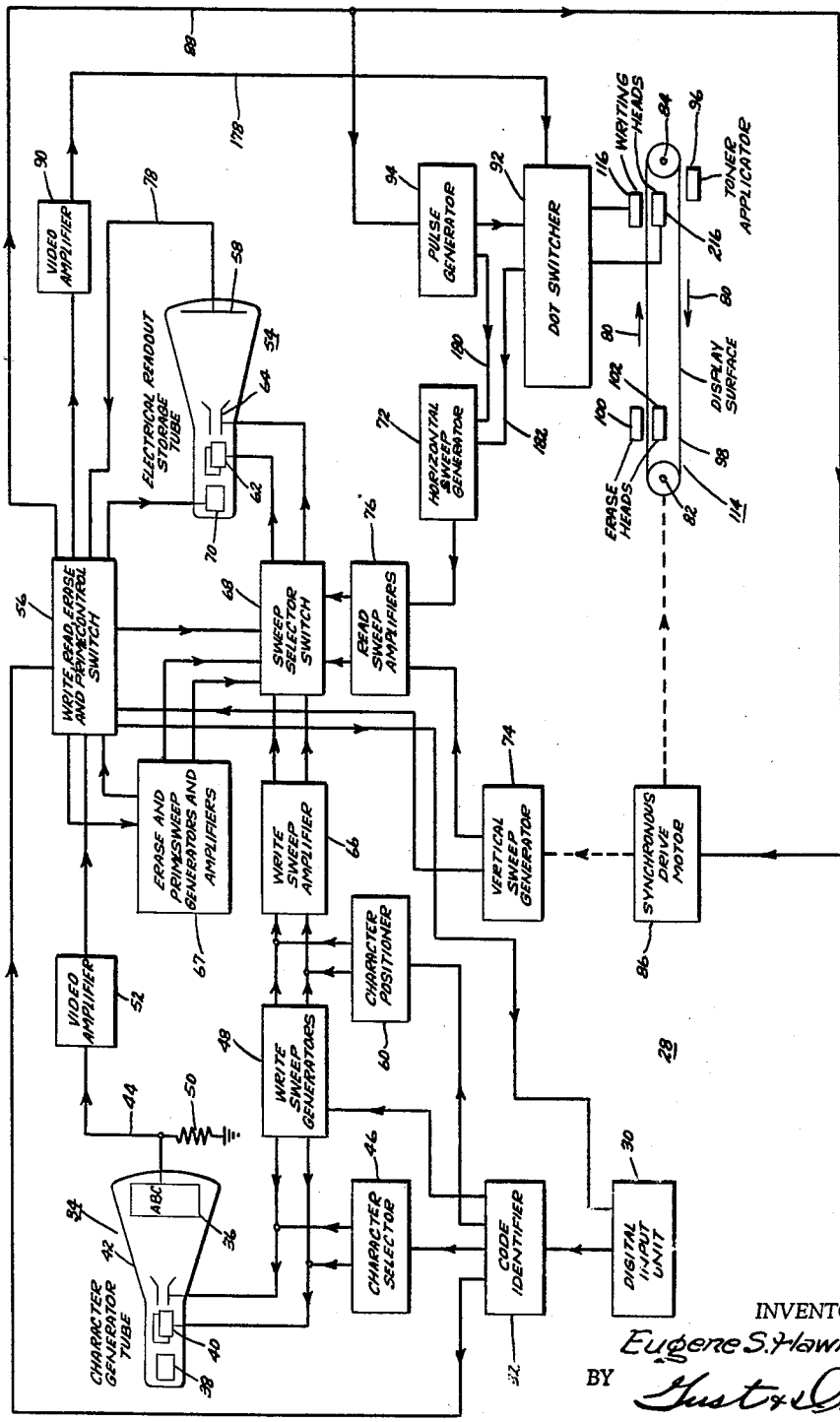

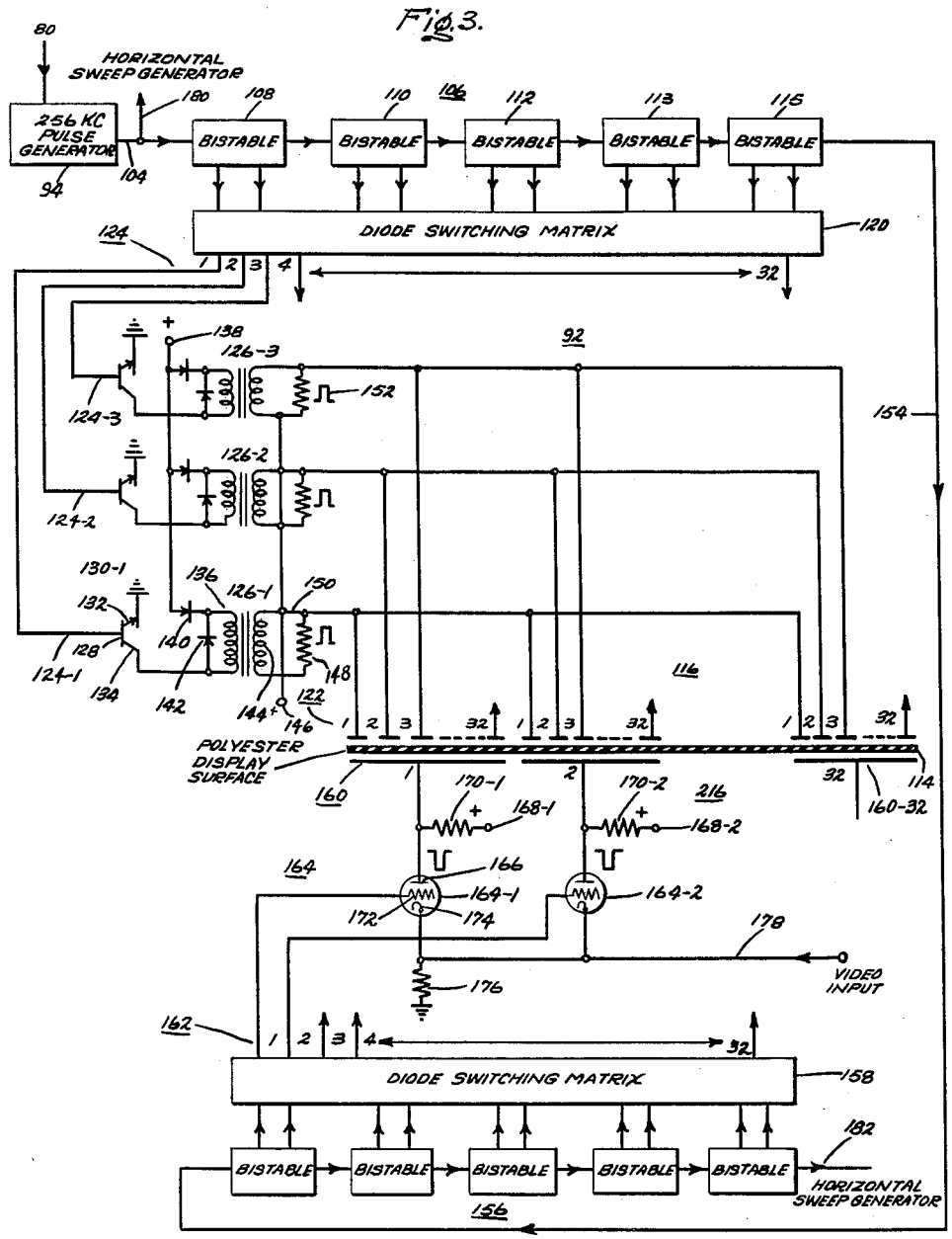

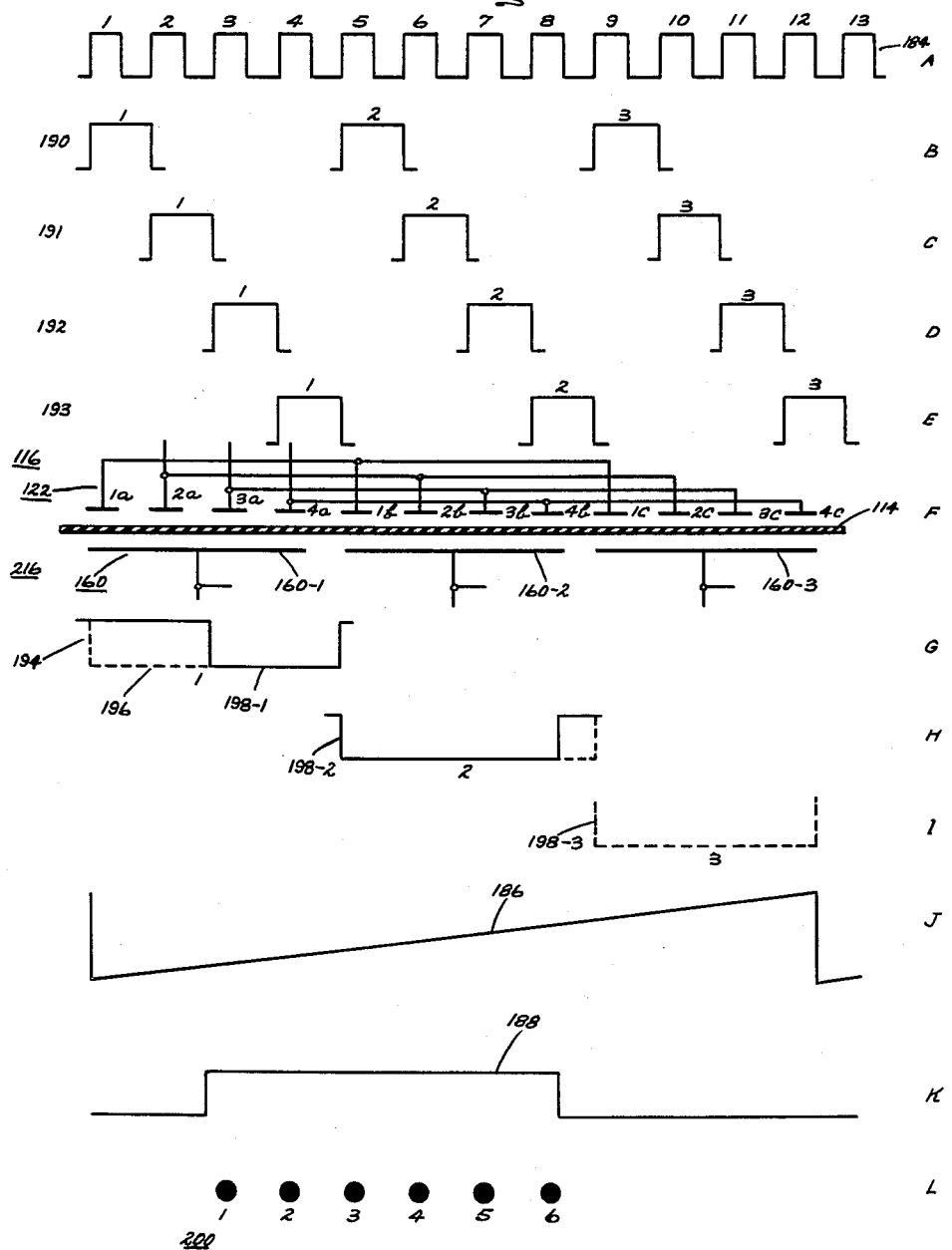

INVENTOR.
Eugene S. Hawkins,
BY
Attorneys.

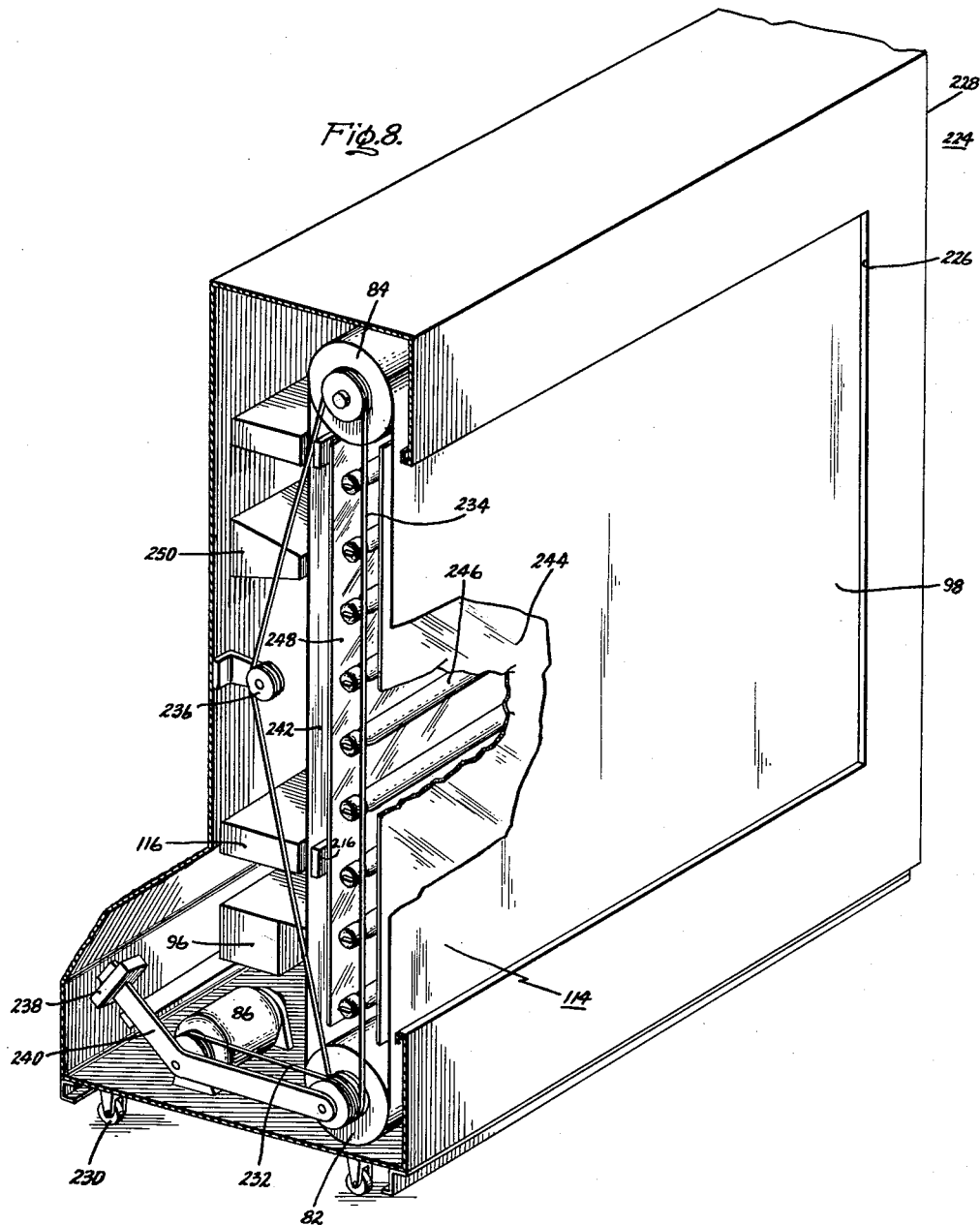

3,074,056
SYSTEM FOR LARGE-AREA DISPLAY OF PICTORIAL AND ALPHA-NUMERIC INFORMATION
Eugene S. Hawkins, Orange, Calif., assignor to International Telephone and Telegraph Corporation
Filed Mar. 28, 1960, Ser. No. 18,008
6 Claims. (Cl. 340—324)

This invention relates to a system for presenting alpha-numeric information, i.e., words and numbers, and pictorial or graphical information, such as maps, graphs, etc., visually on large wall displays for group viewing.

There are occasions when it is desirable visually to display various types of printed and/or pictorial information on a large area surface to permit viewing thereof by a number of persons. In the past, such large area display has been provided by conventional optical projection techniques which generally required a darkened room for optimum viewing. Furthermore, in instances where the alpha-numeric information to be displayed is in the form of coded electrical characteristics, optical projection requires the intermediate step of printing the information before it can be optically projected, and likewise, pictorial or graphical information conventionally requires transfer to a transparency for best optical projection.

It is therefore desirable to provide a system for large area display of alpha-numeric and pictorial information which does not employ optical projection techniques.

A printed page or a rectangular graph or pictorial display may be divided into a matrix comprising a predetermined number of discrete dots, the number depending upon the resolution required, e.g., much in the nature of a newspaper half-tone. Thus, the area to be viewed may be divided into incremental areas, such as 1,000 horizontally and 1,000 vertically to provide a potential of 1,000,000 dots. In order to display the information in dot form, the horizontal dimension of the display surface may be divided into a number of discrete incremental segments and one horizontal line of the alpha-numeric or pictorial information formed by sequentially scanning the line and forming dots where black marks are required. Then, if the horizontal dot forming mechanism and the display surface are moved vertically with reference to each other as the scanning is repeated, a rectangular display will be formed much in the nature of a television raster.

In accordance with the broader aspects of my invention, therefore, I provide means for receiving the information to be displayed and for converting the same into a corresponding time-based signal. Means including a plurality of respectively actuable elements are provided for forming one line of the visual display and means are provided for sampling the time-based signal at discrete intervals to determine the presence or absence of the signal at each interval, the elements being sequentially actuated responsive to the presence of the time-based signal at the respective intervals. In the preferred embodiment of my invention, the display surface is formed of dielectric material which will retain an electrostatic charge when a voltage pulse is applied to an incremental area. The visual display forming elements thus form an incremental charge on the dielectric material in dot form when a pulse is applied thereto. In order to render the charges visible, a charged toner is applied over the display surface which adheres where the dielectric material has been charged in accordance with well known xerographic techniques.

It is accordingly an object of my invention to provide an improved system for large area display of pictorial and alpha-numeric information.

The above-mentioned and other features and objects of this invention and the manner of attaining them will become more apparent and the invention itself will be best understood by reference to the following description of an embodiment of the invention taken in conjunction with the accompanying drawings, wherein:

FIG. 2 is a block diagram illustrating a preferred embodiment of my invention for presenting alpha-numeric information;

FIG. 3 is a schematic illustration showing the preferred embodiment of the dot switcher of FIG. 2;

FIG. 4 is a chart useful in explaining the mode of operation of the system of FIG. 3;

FIG. 8 is a view in perspective, partly broken away, showing the preferred embodiment of the display unit incorporating my invention.

Figure 1:
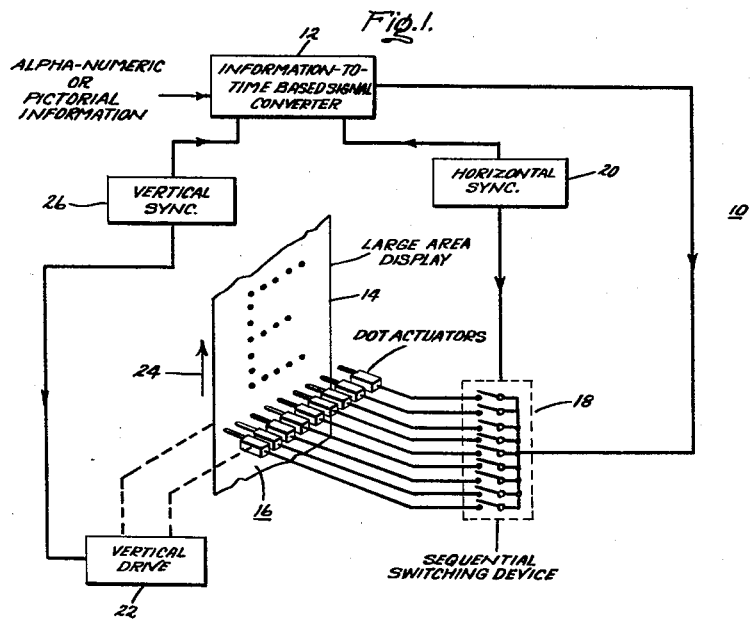
FIG. 1 is a schematic illustration in block diagram form showing the fundamentals of my invention.

Referring now to FIG. 1, in which the broader aspects of my invention are illustrated, my improved system for large area display of pictorial and alpha-numeric information, generally identified at 10, comprises converter 12 which receives the alpha-numeric or pictorial information and converts the same to a time-based electrical signal. If alpha-numeric information is to be displayed, the input information may be in digital form, i.e., a pulse code from a computer or teletype. Converter 12 will then include means for decoding the digital input to identify the particular characters and their respective locations on the page to be displayed and a character generating device, such as a monoscope tube, for providing a time based video signal corresponding to the input character. Since the input rate of the system 10 may be considerably faster than the printing rate, it will also be desirable to provide storage means in converter 12 to store the character-responsive signals for subsequent reading-out at a slower speed consistent with the capabilities of the printing apparatus.

In the case of pictorial information, converter 12 may be a television camera tube, which again feeds a storage device unless the scanning rate of the camera tube is made consistent with the scanning capabilities of the printing apparatus.

Large area display means 14 is provided and a plurality of dot-forming elements 16 are provided in spaced apart alignment along one dimension of display means 14, dot forming elements 16 being capable of selectively forming, when respectively actuated, a line of dots on display means 14. Thus, in the preferred embodiment of my invention, display means 14 is a sheet of dielectric material and dot-forming elements 16 are electrodes which form, when actuated, incremental charged areas in dot form on the sheet 14. Thus, in accordance with well-known xerographic techniques, a charged black toner material may be applied to the surface 14 to which it will adhere where the dielectric material has been charged, thus rendering the dots visible.

Dot forming elements 16 are sequentially connected to converter 12 by switching means 18. Sequential switching means 18 is synchronized with converter 12 by horizontal synchronizing circuitry 20 to provide successive sequential actuation of dot-forming elements 16. Thus, sequential switching device 18 sequentially samples the time-based signal provided by converter 12 at discrete intervals to determine the presence or absence of the signal at each interval thereby sequentially actuating dot-forming elements 16 responsive to the presence of the signal at the respective intervals. It will now be seen that one sequential actuation of dot-forming elements 16 by sequential switching device 18 corresponds to one horizontal scan of the input information by converter 12.

In order to complete the visual display on dielectric sheet 14, vertical drive 22 is provided for moving display device 14 with respect to dot-forming elements 16 along the other dimension of the display means, as shown by the arrow 24. Vertical drive 22 is synchronized with converter 12 by vertical synchronizing circuitry 26, and thus, relative motion 24 of display surface 14 with respect to dot-forming elements 16 is synchronized with the vertical scanning by converter 12.

Referring now to FIG. 2, I have shown a preferred embodiment of my system for large area display of alphanumeric information. This system, generally identified at 28 comprises input unit 30 which provides the input information in digital form, i.e., a pulse code; the digital input unit 30 may be a computer, a teletype machine, or a device of the type manufactured by Friden, Inc., referred to by the tradename "Flexo-Writer." Digital input unit 30 is coupled to code identifier or decoding unit 32, which separates the character identifying portion of coded digital input from the position identifying portion. The position identifying portion of the digital input code may merely indicate that the system is to operate in a typewriter mode of operation, i.e., letters printed from left to right, line after line until a full page is completed, or may identify a particular location or locations on the page for particular characters.

Generation of time-based signals responsive respectively to the input characters is accomplished by character generator tube 34 which, in the illustrated embodiment may be a monoscope tube of the type manufactured by Vacuum Tube Products Division, Hughes Aircraft Co. In this tube sixty-four characters (letters, numerals, punctuation, etc.) or more, are printed on aluminum target 36 in ordinary printer's ink in horizontal and vertical rows. Tube 34 is provided with electron gun 38 and horizontal and vertical deflection elements 40 and 42 which cooperate to scan an electron beam over the target 36. The time-based output signal, corresponding to any preselected character is provided in output circuit 44 of tube 34 by initially positioning the electron beam on the desired character and then scanning the character in raster fashion. In order to select the particular character and to position the beam thereon, code identifying unit 32 is coupled to character selector unit 46 which in turn is respectively coupled to horizontal and vertical beam deflection means 40 and 42 of tube 34. Character selector 46 thus converts the character code into corresponding horizontal and vertical deflection voltages, thereby positioning the electron beam from electron gun 38 to the proper location on target 36 for the particular character called for by the digital code. In order to provide the raster scanning of the particular character, sweep generators 48 are provided coupled respectively to horizontal and vertical beam deflection means 40 and 42 of tube 34 and providing a delta x-delta y sweep voltage respectively superimposed on the position voltages provided by character selector 46. The delta x-delta y sweep voltages provided by sweep generators 48 cause the electron beam in tube 34 to be scanned over the particular characters selected in a television-type raster of sufficient size to cover only the selected character on target 36. The electron beam provided by electron gun 38 has a constant intensity and as it is scanned across the selected character on the target, the secondary emission current from the target is modulated since the aluminum target and the ink from which the characters are formed exhibit different secondary emission coefficients. Since the target current is equal to the difference between the constant intensity beam current and the varying secondary emission current, the character modulation appears across the output load resistor 50.

The character video signal in the output circuit 44 of character generator tube 34 is amplified by video amplifier 52 and applied to the writing signal input circuit of electrical read-out storage tube 54 by write-read-erase and prime control switch 56.

Storage tube 54 is preferably a high resolution electrical output recording storage tube, such as Raytheon type QK-685. Storage tube 54 is necessary in the system of FIG. 2 since the system thus far described is capable of receiving digital input information at the rate of 30,000 characters per second, or 4,000 characters in 133⅓ milliseconds, whereas ten seconds is required for visual display of 4,000 characters, thus, a complete page of information, containing as many as 4,000 characters can be written into the storage electrode of storage tube 54 at a very fast rate and subsequently read out at a slower rate compatible with the electrostatic printing apparatus to be hereinafter described. Operation of the recording storage tube 54 involves priming, writing, reading and erasing. Priming is accomplished by uniformly charging storage electrode 58, by reducing the collector screen voltage below the critical potential and scanning storage electrode 58 with an electron beam in raster fashion. In the writing operation, the control grid bias is set at cut-off and the signal to be stored is applied. In the reading operation, the control grid bias is set to permit beam current and the storage electrode voltage is adjusted so that the stored signal will modulate the beam with the output then being taken from the signal electrode portion of the storage electrode. Erasing operation is performed by writing a direct current signal into the tube, thus normalizing the storage electrode at full modulation level with the signal electrode and storage screen voltages being the same. The mode of operation of the electrical-output storage tube is well known to those skilled in the art, and control of the prime, write, read and erase operations is accomplished in the illustrated embodiment by switching unit 56. Code identifying unit 32 is coupled to switching unit 56 and thus provides a signal thereto at the beginning of an input code group which initiates writing operation of storage tube 54 which has been previously primed as hereinafter described.

In the illustrated embodiment, the selected character signals from character generator tube 34 are written onto storage electrode 58 of storage tube 54 at positions determined by the position code as identified by the code identifying unit 32. Code identifying unit 32 is thus coupled to character positioner unit 60. If the input digital code indicates the typewriter mode of operation, character positioner 60 will provide horizontal and vertical "stair-step" beam deflection voltages for storage tube 54 which will sequentially position the beam from left to right and top to bottom. If, on the other hand, the input digital code calls for selective character positioning at preselected locations on the page, character positioner 60 will provide the requisite vertical and horizontal beam positioning deflection voltages for the storage tube 54. Character positioner 60 is coupled to horizontal and vertical beam deflection means 62 and 64 of storage tube 54 by sweep amplifiers 66 and sweep selector switch 68. Sweep selector switch 68 is actuated by switch 56 to connect beam deflection means 62 and 64 of storage tube 54 to character positioner 60 during writing operation and to other sweep generating means during reading, erasing and priming operations, as will be hereinafter described. The delta x-delta y sweep generators 48 are also coupled to sweep amplifiers 66 and it will thus be seen that the writing beam in storage tube 54 is initially positioned on storage electrode 58 at the proper position called for by the input digital code and then swept in raster fashion to write the selected character from the character generator tube 34 onto the storage electrode 58. It will be seen that the horizontal and vertical saw-tooth or delta x-delta y writing sweeps of the electron beam of storage tube 54 provided by electron gun 70 are similar in shape and identical in time to the character scanning sweeps of the character generator tube 34, being provided by the same sweep generators 48, however, the amplitudes of these sweep voltages may be varied thus to determine the size of the characters to be written on the storage electrode 58. Thus, code identifying unit 32 is also coupled to sweep amplifiers 66 to regulate the gain thereof responsive to the input code and thereby determine the amplitude of the raster sweep of the beam of storage tube 54 and thus in turn the size of the characters stored on the storage electrodes.

Assuming now the typewriter mode of operation, it will be seen that after the first character has been completely written into the storage electrode 58 of storage tube 54, character positioner 60 will advance the line scanning sweep one horizontal step so that another character may be written. This continues sequentially until the complete horizontal line has been written on the storage electrode 58, at which point the horizontal line scanner is returned to its starting point and the vertical page scanning sweep is advanced one step downward. The page scan continues to advance one line at a time after each horizontal line is completed until the page is finished. The end of the page is indicated in the input digital code, and thus code identifying unit 32 will provide signals to switch 56 and character positioner 60 indicating the end of a page so that the writing beam of tube 54 is blanked off, sweep selector switch 68 is actuated to switch from writing to reading operation, and storage tube 54 is changed from writing to reading operation.

Read-out of the stored data on storage electrode 58 of storage tube 54 is accomplished by scanning the storage electrode 58 with the electron beam from gun 70 with a television-type raster large enough to cover the entire page of stored information. Linear saw-tooth sweep voltages are employed for both the horizontal and vertical scans, the horizontal sweep voltages during the reading operation being provided by horizontal sweep generator 72 and the vertical saw-tooth voltage being provided by vertical sweep generator 74. Horizontal and vertical sweep generators 72 and 74 are coupled to the horizontal and vertical deflection means 62 and 64 of storage tube 54 during reading operation by selector switch 68 and sweep amplifiers 76.

In order visually to display the time-based signal in output circuit 78 of storage tube 54 provided during reading operation, I provide, in the illustrated embodiment, an endless belt 114 of dielectric material, such as a polyester material of the type referred to by the tradename "Mylar" which is caused to move in the direction shown the arrows 80 by drive cylinders 82 and 84. Drive cylinder 82 in turn is driven by synchronous drive motor 86. Movement of belt 114 in the direction 80 provides vertical scanning of the display corresponding to the vertical scanning of storage electrode 58 of storage tube 54 during the reading operation. Operation of drive motor 86 is initiated by a signal from switch 56 through connection 88. Thus, when switch 56 changes from writing to reading operation, operation of drive motor 86 is initiated thereby to initiate movement of belt 114 of dielectric material. Writing heads 116 and 216 positioned on opposite sides of belt 114 and extending transversely thereacross form the incremental electrostatic charges on belt 114 in dot form. Writing heads 116 and 216 are sequentially actuated by dot switcher circuit 92 coupled to output circuit 78 of storage tube 54 by switch 56 and video amplifier 90 during reading operation. Dot switcher 92 which, as will be hereinafter more fully described, preferably includes a pulse counter, switching matrix and modulated pulse amplifiers, sequentially samples the time based video signal from storage tube 54 as discrete intervals and energizes the respective dot forming elements of the writing heads 116 and 216 in response to the presence of the video signal. Switch 92 is sequenced by pulse generator 94 which in turn is initially actuated by a trigger signal provided by switch 56 responsive to change thereof from writing to reading operation. Pulse generator 94 also triggers horizontal sweep generator 72 so that the first horizontal sweep of storage electrode 58 of storage tube 54 during read-out operation is initiated responsive to the first horizontal sampling of the video output signal from the storage tube 54 by dot switcher 92. When dot switcher 92 has completed one sequential sampling operation, thereby providing one horizontal line scan of belt 114, a trigger signal is provided to horizontal sweep generator 72 to initiate a new horizontal sweep of the reading electron beam in the storage tube 54. The incremental charges in dot form on belt 114 of dielectric material are rendered visible by toner material applicator 96 so that the display appears on surface 98 of the dielectric belt 114. The display is subsequently erased to permit writing of a new display in dot form on belt 114 by erase heads 100 and 102 on opposite sides of the belt as shown.

Vertical sweep generator 74 which is driven by the synchronous drive motor 86 may be a single potentiometer which thereby provides the vertical sweep voltage for the storage tube 54 during read-out operation. Potentiometer 74 may also be coupled to the switch 56 thereby to provide an actuating signal thereto at the end of one complete vertical scan of the storage electrode 58 of storage tube 54 thereby to actuate switch 56 successively to erase, prime and write operation. Switch 56 may be coupled to digital input unit 30 to provide a trigger signal thereto at the end of the priming of storage tube 54 thereby indicating that the complete page of stored information has been read out of the storage tube and displayed, and the storage tube erased and primed, and thus that a new page of input information may be read into character generator tube 34. It will be seen that actuation of the switch 56 from reading to erase and priming operation will, by virtue of connection 88, turn off pulse generator 94 and the synchronous drive motor 86 thus terminating operation of the dot switcher 92, horizontal sweep generator 72, and the dielectric display belt 114. Actuation of switch 56 from read out to erase and prime likewise changes switch 68 from reading to erase and prime operations, thereby connecting deflection means 62 and 64 of storage tube 54 to erase and prime sweep generators and amplifiers 67 in order to prepare the storage tube for writing the next page of information onto the storage electrode 58. On completion of the priming operation, erase and prime sweep generators and amplifiers 67 actuate switch 56, thereby in turn actuating switch 68 connecting deflecting means 62 and 64 of storage tube 54 to character positioner 60 and sweep generators 48 in order to write the next page of information onto the storage electrode 58.

Referring now to FIG. 3, there is shown the preferred embodiment of the dot switcher 92 which comprises the counter, switching matrices and modulated pulse amplifiers and the writing heads 116 and 216 in accordance with my invention. In the specific embodiment, the writing heads 116 and 216 provide 1,024 individual dots equally spaced apart in a straight horizontal line across the width of the dielectric material belt 114. These dots must be sequentially turned on and off from left to right across the display at the rate of 256,000 dots per second to provide a horizontal sweep rate of 250 lines per second. During the time of each sequential actuation of the 1,024 dots, the dielectric material belt 114 is moved vertically in the direction 80 (FIG. 2) at a constant rate by drive motor 86 so that each successive line is printed just below its predecessor, much in the manner of a television raster.

In order to accomplish the successive sequential switching of the 1,024 individual printing elements, the arrangement now to be described is provided. Pulse generator 94 is a stable 256 kc. pulse generator, i.e., it provides 256,000 timing pulses per second. The output circuit 104 of pulse generator 94 is coupled to the input of a five-stage binary counter 106 which may be formed of five bistable multivibrators 108, 110, 112, 113 and 115. Binary counter 106 is in turn coupled to a diode switching matrix 120 which employs ninety-six diodes sequentially to pulse thirty-two output circuits on and off. The five-stage binary counter 106 and diode switching matrix 120 do not form a part of my invention per se, being shown and described in the Proceedings of the Institute of Radio Engineers, volume 37 (February 1949), pages 139 through 147.

Writing head 116 is formed of 1,024 individual dot-forming electrodes 122 divided into thirty-two groups of thirty-two electrodes. The electrodes of each group of 32 electrodes of writing head 116 are respectively connected in parallel, as shown, i.e., electrodes number 1 of all of the thirty-two groups are connected in parallel, electrodes number 2 of all of the thirty-two groups are connected in parallel, etc.

It will be seen that the counter 106 of diode switching matrix 120 provides a pulse output sequentially on each of the thirty-two output circuits 124 of the switching matrix 120, i.e., the first pulse received from pulse generator 94 in essence appears on the first output circuit 124–1 of matrix 120, the second pulse from pulse generator 94 appears on the second output circuit 124–2, etc. The thirty-two output circuits 124 of the diode switching matrix are respectively connected to the thirty-two parallel connected electrodes 122 of writing head 116 by pulse transformers 126 which provide the desired positive voltage pulses on the electrodes 122. Thus, output circuit 124–1 from the switching matrix 120 is coupled to base 128 of transistor 130–1 which has its emitter 132 connected to ground and its collector 134 coupled to one end of primary winding 136 of transformer 126–1. The other end of the primary winding 136 of transformer 126–1 is connected to a suitable source 138 of positive potential by diode 140 and another diode 142 is coupled across primary winding 136 of transformer 126–1. Secondary winding 144 of transformer 126–1 has one end connected to a suitable positive source of potential 146 and has resistor 148 connected thereacross. The other side 150 of secondary winding 144 is connected to the number one electrode 122–1 of each of the thirty-two groups of electrodes of the writing head 116. The other output circuits 124 of diode switching matrix 120 are similarly connected to the respective electrodes 122 of writing head 116 by transistors 130 and pulse transformers 126, as shown. Positive-going pulses 152 are thus sequentially applied to the thirty-two electrodes 122 of all of the groups of electrodes in the writing head 116, these pulses being of such an amplitude that the dielectric belt 114 will be incrementally charged in dot form when a negative pulse of suitable amplitude is applied to the opposite side by the writing head 216.

The final output from binary counter 106 which is an 8 kc. pulse train in line 154 is coupled to the input of another binary counter chain 156 and diode switching matrix 158 identical to counter 106 and diode matrix 120. Writing head 216 is formed of thirty-two electrodes 160 respectively associated with the thirty-two groups of thirty-two electrodes 122 forming the writing head 116. Thus, the first electrode 160 of writing head 216 cooperates with the thirty-two electrodes 122 of the first group of electrodes of writing head 116, the second electrodes 160 of writing head 216 cooperates with the thirty-two electrodes of the second group of electrodes 122 of the writing head 116, etc. The thirty-two output circuits 162 of diode matrix 158 are respectively coupled to the thirty-two electrodes 160 forming the writing head 216 by gate tubes 164. Each of the gate tubes 164 has its plate 166 coupled to a suitable source 168 of positive plate potential by plate resistor 170 and to the respective electrode 160 of the writing head 216. The control grid 172 of each of the gate tubes 164 is coupled to the respective output circuit 162 of switching matrix 158 and has its cathode 174 connected to ground by cathode resistor 176. All of the cathodes 174 of the gate tubes 164 are connected to the output of video amplifier 90 by connection 178.

It will now be seen that the video information from the storage tube 54 is coupled to the cathodes 174 of the gate tubes 164 during the storage tube read out operation. When a black mark is to be printed on the dielectric belt 114, the video information applied to cathodes 174 is negative, and therefore the respective tube 164 is keyed on by the positive-going pulse applied to the respective grid 172 from the respective output circuit 162 of the diode matrix 158 so that the respective tube 164 conducts heavily, thereby applying to belt 114 a negative pulse with respect to the pulses applied by printing head 116. When, on the other hand, a black mark is not to be printed, the video signal is essentially zero and therefore the respective tube 164 will not be gated on even in the presence of a positive pulse applied to its grid 172 from the respective output circuit 162 of switching matrix 158.

As previously indicated, pulse generator 94 is coupled to horizontal sweep generator 72 by connection 180 in order to initiate the horizontal scanning sweeps applied to horizontal deflection means 62 of storage tube 54 during read-out operation and the final output of binary counter 156 is also coupled to horizontal sweep generator 72 by connection 182 in order to reset sweep generator 72 in order to initiate a new horizontal sweep responsive to completion of the pulse count of 1,024.

The mode of operation of the sampling circuitry of FIG. 3 will be explained in conjunction with FIG. 4 in which for the sake of simplicity, writing head 116 is shown as being formed of twelve dot-forming electrodes 122, divided into three groups of four, with each group of four electrodes 122 cooperating with one electrode 160, for a total of three electrodes 160. The timing pulses 184 provided by pulse generator 94 are shown at A in FIG. 4, it being observed that the first timing pulse initiates horizontal sweep voltage 186 from the horizontal sweep generator 72 as shown at J in FIG. 4. FIG. 4K shows an assumed video output signal 188 output circuit 78 and 178 of the storage tube 54 during the reading operation. Reference to FIGS. 4B, C, D and E will show that the first timing pulse 184–1 will result in the diode matrix 120 applying pulse 190 to the first electrodes of each of the groups of electrodes of writing head 116, i.e., timing pulse 184–1 causes pulses 190–1 to be applied to electrodes 122–1a, 1b and 1c. Likewise, the second timing pulse 184–2 results in pulses 191–1 on electrodes 122–2a, 2b and 2c, timing pulse 184–3 provide pulses 192–1 on electrodes 122–3a, 3b and 3c, and timing pulse 184–4 impress pulses 193–1 on electrodes 122–4a, 4b and 4c. It will be seen in the illustrated example in FIG. 4 that a pulse count is completed with a count of four pulses, and thus, timing pulse 184–5 impresses pulse 190–2 on electrodes 122–1a, 1b and 1c and so on.

Referring now to FIGS. 4G, H, I, K and L, it will be seen that diode matrix 158 would impress upon electrode 160–1 negative going pulse 194–1 as indicated by dashed line 196, if a video signal were present to turn on gate tube 164–1. However, as indicated in FIG. 4K, during the times that pulses 190–1 and 191–1 are applied to electrodes 122–1a and 2a, no video signal is present, and thus gate tubes 164–1 and 164–2 will not be turned on. However, by the time pulse 192–1 is applied to electrode 122–3a, video signal 188 has appeared, thus causing tube 164–3 to be turned on to impress negative going pulse 198–1 on electrode 160–1. Thus, pulses 192–1 and 193–1 impressed on electrodes 122–3a and 122–4a will, in the presence of negative-going pulse 198–1 on electrode 160–1 cause the printing or formation of incremental charges 200–1 and 200–2 on dielectric belt 114. It will likewise be seen that due to the presence of video signal 188 during the second sequential pulsing of electrodes 122, negative going pulse 198-2 will be applied to electrode 160-2 thus forming dot charges 200-3, -4, -5 and -6 on dielectric belt 114. It will finally be seen that during the third sequential pulsing of electrodes 122 during which time electrode 160-3 would have a negative-going pulse 198-3 applied thereto (shown in dashed lines), there is no video signal, and thus negative going pulse 198-3 is not applied to electrode 160-3 and no corresponding incremental charges are formed on the surface of dielectric belt 114.

It will now be seen that with the above described arrangement, the video signal from the storage tube 54 during read-out operation is sampled 1,024 times during one horizontal sweep of the reading beam of storage tube 54 and the potentials respectively proportional to the video at each discrete interval are impressed upon the dielectric material forming the belt 114. The speed of synchronous drive motor 86 is adjusted so that approximately 1,000 horizontal sweeps of the 1,024 dot forming elements will occur, in vertically sweeping from the top to the bottom edges of the storage electrode 53.

Figure 5:
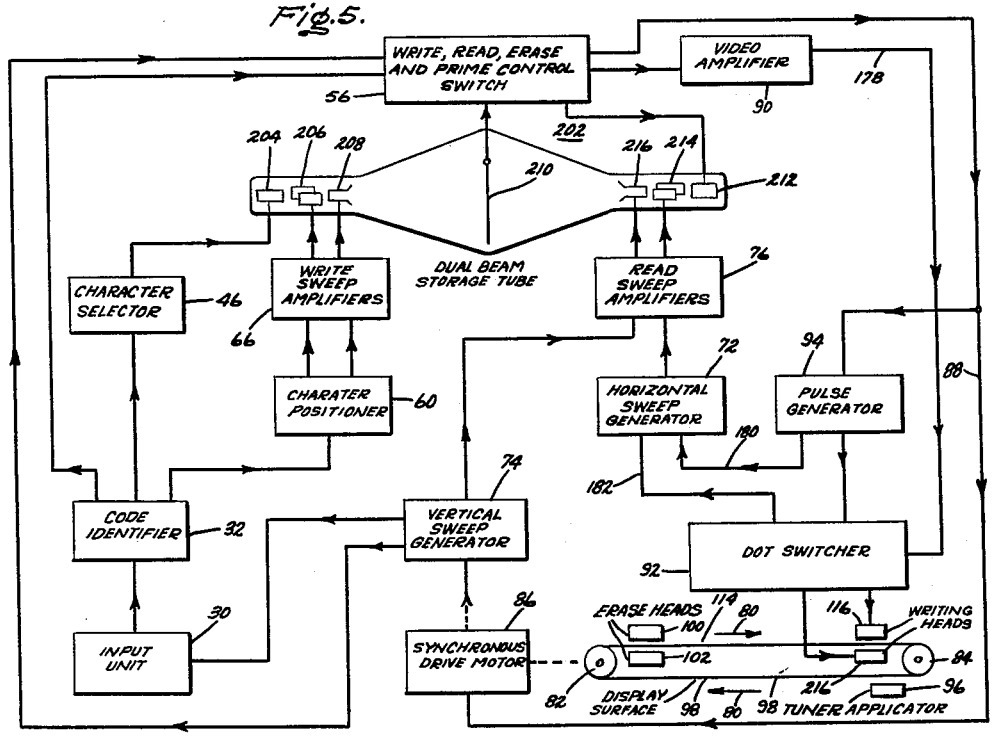
FIG. 5 is a block diagram showing a modified form of my invention for presenting alpha-numeric information.

Referring now to FIG. 5 in which like elements are indicated by like reference numerals, there is shown a modified form of the system of FIG. 2 incorporating a dual beam scan converter tube 202 which performs the functions of the character generator tube 34 and storage tube 54 of the system of FIG. 2. Scan converter tube 202 may be a tube such as a Raytheon QK-703 having its writing gun modified to incorporate a character matrix. Here, the writing beam provided by the character matrix gun 204 of scan conversion tube 202 is extruded in the shape of the desired character and then deflected to the desired location on the storage electrode 210 by horizontal and vertical deflection means 206 and 208. Character selector unit 46 thus is coupled to character matrix gun 204 and character positioner unit 60 is coupled to write sweep amplifiers 66 which in turn are coupled to the horizontal and vertical writing beam deflection means 206 and 208. Thus, a beam having a cross-sectional configuration responsive to the character code is provided positioned on storage electrode 210 at a location called for by the position code. Read-out of the stored information is accomplished in the same manner as that described above in connection with FIG. 2, reading gun 212 providing a reading beam which scans storage electrode 210 during read-out operation with a raster deflection provided by horizontal and vertical deflection means 214 and 216.

Figure 6:
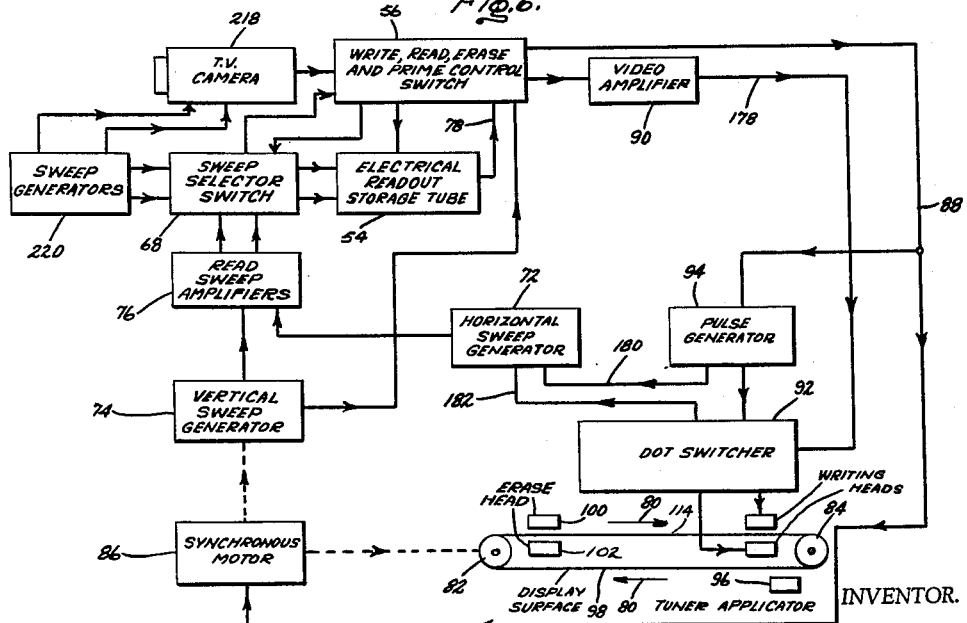
FIG. 6 is a block diagram showing a system in accordance with my invention for presenting pictorial or graphical information.

Referring now to FIG. 6 in which like elements are again indicated by like reference numerals, there is shown a system in accordance with my invention for displaying maps, charts, graphs, or other data already prepared on hard copy; the system of FIG. 6 may also be used for presenting remote scenes or pictorial views. Here, a conventional television camera tube 218 is provided, with horizontal and vertical sweep voltages being provided by sweep generators 220. Television camera tube 218 is coupled to storage tube 54 by write, read, erase and prime control switch 56 during writing operation with sweep generators 220 likewise being coupled to the deflection means of storage tube 54 by sweep selector switch 68 during writing operation. When one complete picture has been written into the storage electrode of the storage tube 54 from camera 218, switch 56 changes to reading operation thereby connecting output circuit 78 of storage tube 54 to the dot switcher assembly 92 and connecting horizontal and vertical sweep generators 72 and 74 to the storage tube deflection means in the manner previously described. It will be readily understood that the system of FIG. 6 is not suitable for continuously displaying a television picture having rapid movement, but will present a complete new display of the image impressed upon camera tube 18 every ten seconds.

Figure 7:
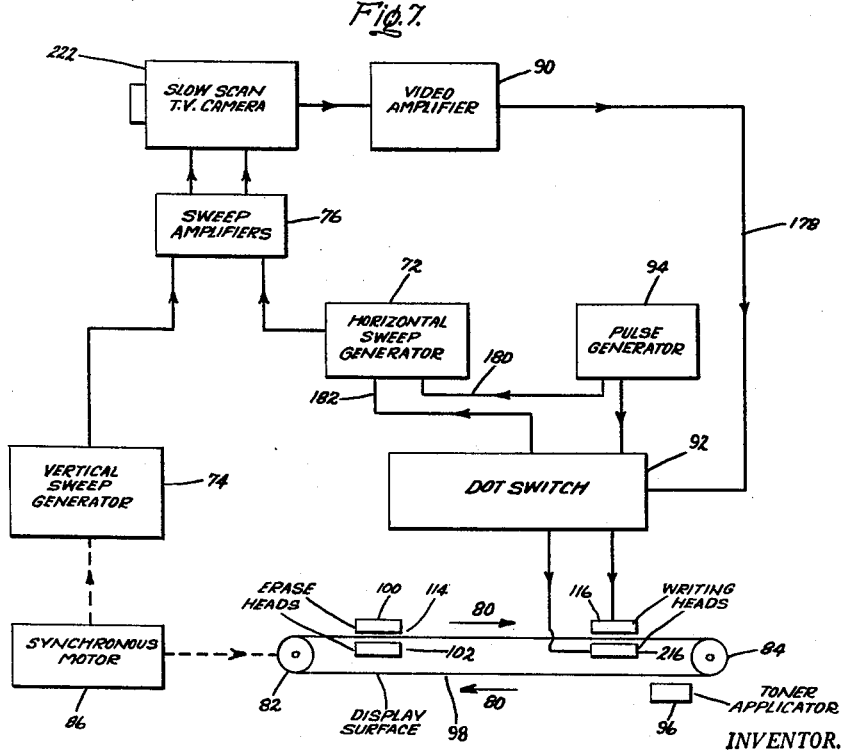
FIG. 7 is a block diagram showing a modified form of the system of FIG. 6.

Referring now to FIG. 7 in which like elements are still indicated by like reference numerals, the system of FIG. 6 incorporated storage tube 54 in order to accommodate a television camera tube 218 having conventional scanning rates which are considerably faster than the scanning capability of the electrostatic printing apparatus. If, however, a slow scan television camera system is incorporated, the intermediate storage tube 54 may be eliminated to provide the system shown in FIG. 7 in which a slow scan television camera tube 222, which may be of any type now well known in the art, is incorporated with its horizontal and vertical scanning being provided by the horizontal and vertical sweep generators 72 and 74.

Referring now to FIG. 8, there is shown the mechanical construction of an electrostatic display unit suitable for use in my invention. In the specific embodiment illustrated, the display unit, generally identified as 224 is arranged to provide a large area display which, for example, may be ten feet square. Here, dielectric belt 114 is trained over lower and upper drive cylinders 82 and 84 and thus the display surface 98 is vertically arranged and viewed through window 226 in housing 288 which may be mounted on castors 230 for movement as desired. Lower and upper drive cylinders 82 and 84 are driven by synchronous motor 86 by means of belts 232 and 234 with the tension of belt 234 being selectively adjusted by means of adjustable idler pulley 236. The weight of the lower drive cylinder 82 which would otherwise apply considerable tension upon the dielectric belt 114 is compensated for by counter-weight 238 on arm 240 which is pivotally mounted coaxial with the shaft of motor 86 and which rotatably supports drive cylinder 82 at its end remote from counter-weight 238. Writing heads 116 and 216 are supported by housing 228 on opposite sides of run 242 of dielectric belt 114 remote from display surface 98 and toner applicator 96 is disposed on the same side of run 242 of dielectric sheet 114 as writing head 116 and below the same, as shown, being likewise supported by housing 228. Erasing heads 100 and 102 are supported by housing 228 on either side of run 242 of dielectric belt 114 immediately below the upper drive cylinder 84.

Display surface 98 of dielectric belt 114 is disposed in front of light diffusing window 244 which is back-lighted by a plurality of suitable lamps 246, such as fluorescent lamps. A suitable light reflector, such as mirror 248, is in turn disposed behind the lamps 246.

It will be readily seen that as the dielectric belt 114 passes around the drive cylinders, it passes between erasing heads 100 and 102 in which the previous display is erased by pulsing the tape with pulses of opposite polarity from those which originally formed the incremental charges. The belt 114 then passes through cleaner 250 which insures that the toner from the previous display is removed from the belt 114 and then passes through the writing heads 116 and 216 where the new incremental dot-defining charges are applied as previously described. The belt then passes through the toner applicator 96, where the charged toner material is applied to the surfaces which have been incrementally charged by the writing heads 116 and 216 and the belt 114 is then stopped in front of the window 226.

Electrostatic formation of a visible display is not my invention, per se, the specific techniques being disclosed in numerous patents assigned to the Haloid-Xerox Company.

It will now be readily apparent that the incrementally sampled video signal may be converted into a readable mark by other techniques, such as magnetic recording or electroplating. In the magnetic recording technique, a belt of material similar to conventional magnetic recording tape would be employed and writing heads 116 and 216 would respectively employ a plurality of magnetic recording elements rather than electrostatic charge forming electrodes, as is well known in the art. The incremental magnetized areas of the magnetic recording tape would then be rendered visible by applying magnetic particles to the tape which would adhere to the magnetized areas and fall away from the areas which were not magnetized. In the electroplating technique, the belt would be formed of paper moistened with an electrolyte, with the anodes formed of metal such as stainless steel. In such a system, when each dot is pulsed, metallic ions would be deposited on the paper and react with the electrolyte to form a black mark.

It will also be readily apparent that my invention is equally usable with a display employing small bulbs, electroluminescent cells, or mechanical shutters. Here, however, the display would necessarily require bulbs, cells or shutters equal in number to the total number of vertical and horizontal dots required with the horizontal row of dot actuators then being moved vertically from top to bottom of the display instead of moving the sheet of material as in the case of the previously described embodiments. The display proper would then consist of the matrix of bulbs, cells or shutters. It is readily apparent that in any display means for use with my invention, each display element must have memory caapbilities, with means being provided to erase the same prior to the writing of new information thereon.

While the system described above is basically a black and white display system, it would be readily comprehended that the capability of displaying one-to-three discrete colors or one-to-three shades of grey in addition to black by writing information into the storage tube at different levels. In such a system, for example, black information could be written into the tube at four volts, red information at three volts, and green information at two volts, and amber information at one volt. During read-out of the storage tube, the four-color information can be separated by clippers, one clipper being biased to pass all signals above 3.5 volts (black information) another biased to pass all information above 2.5 volts (red information), and subtracting the black information, etc. These four video signals could then be routed to four separate writing heads for simultaneous printing during one scan or separate writing during sequential scans of the storage tube.

It will now be readily seen that I have provided a system in which a pictorial or an alpha-numeric display is generated by sampling a video output signal from an electrical read-out storage device, or from a slow scan television camera, my system providing high resolution with any size of display from small to extremely large. My system further provides high contrast with a bright display which can be viewed with normal ambient lighting, and the power consumption of my system is far lower than any system employing conventional optical projectors. Due to the rapid read-in of digital data with my system, time demands on the computer or transmission facilities are minimized. Furthermore, the display of my system is non-volatile, and thus failure of the power source will not destroy the information being displayed. Operating materials required with my system are minimum, with periodic replenishing of the toner supply being all which is required. The electrostatic display apparatus employed with my invention as shown in FIG. 8 is capable of being easily moved to any desired location, and additional display surfaces may be provided serviced by the same electronics. It will further be seen that the character generation capabilities of my system may be reaily changed, i.e., several character generator tubes may be employed and connected in the system to provide the desired character size, etc. To the best of the present applicant's knowledge, the system of the present invention provides a reduction in size and complexity over other known methods of generating large area displays and further the present invention provides digital read-in of character identity and position at far higher rates than other display systems known to the present applicant.

While I have described above the principles of my invention in connection with specific apparatus, it is to be clearly understood that this description is made only by way of example and not as a limitation to the scope of my invention.

What is claimed is:

1. A system for large-area display of pictorial and alpha-numeric information comprising: means for receiving and storing a pattern of signals corresponding to a desired graphic arrangement of said information display means; writing means including a plurality of elements in spaced-apart alignment cooperating with said display means for recording thereon a line of dot increments of a graphic display when said elements are respectively actuated; means for moving said display means through successive line increment positions in relation to said writing means; switching means for sequentially coupling said elements to said signal storing means in predetermined time relation to the movement of said display means, so as to actuate said elements to produce a graphic pattern corresponding to said stored pattern; and means cooperating with said display means for selectively erasing said graphic pattern.

2. A system for large-area display of pictorial and alpha-numeric information comprising: means for receiving said information and converting the same to a corresponding first time-based signal; means for storing a pattern of variable amplitude dot elements corresponding to said time-based signal; large-area display means; writing means including a plurality of elements in spaced-apart alignment along one dimension of said display means and cooperating therewith for recording thereon an incremental visible line of dots in a graphic display when said elements are respectively actuated; means for moving said display means in relation to said writing means; switching means for sequentially coupling said elements of said writing means to successive dot element storing positions in said signal storing means thereby to sample said stored dot elements at discrete intervals and to actuate said elements of said writing means accordingly, thereby scanning said display means in one axis; means for synchronizing said switching means and said moving means thereby to provide scanning of said display means in another axis to produce a complete graphic display; and means cooperating with said display means for selectively erasing said graphic displays.

3. The combination of claim 2 in which said signal storing means includes an electrical read-out storage tube having a storage electrode; means for generating sweep voltages to scan an electron beam thereover in two axes during read-out; and means for coupling one of said sweep voltage generating means to said switching means thereby to synchronize the sweep of said beam in one axis with the sequential actuation of said writing means elements; the other of said sweep voltage generating means being synchronized with said moving means.

4. The combination of claim 2 in which said switching means comprises pulse generator means, pulse counting means coupled to said pulse generator means, and matrix means coupled to said counting means and having a plurality of output circuits for sequentially providing actuating pulses therein, said writing means elements being respectively coupled to said matrix means output circuits and to said signal storing means.

5. The combination of claim 2 in which said plurality of elements comprises a first plurality of elements divided into a plurality of groups, respective elements in each group being connected in parallel, and a second plurality of elements each cooperating with a respective one of said groups of said first plurality of elements; and in which said switching means comprises pulse generator means, first pulse counting means coupled to said pulse generator means, first matrix means coupled to said first counting means and having a first plurality of output circuits for sequentially providing first actuating pulses therein, said parallel connected elements being respectively coupled to said first matrix means output circuits, second pulse counting means coupled to said first pulse counting means and actuated responsive to each complete pulse count of said first pulse counting means, second matrix means coupled to said second pulse counting means and having a second plurality of output circuits for sequentially providing second actuating pulses therein; other switching means respectively coupling said second plurality of elements to said second matrix means output circuits, said other switching means being coupled to said signal storing means and actuated in response to the presence of said second signal whereby said second actuating pulses are coupled to said second elements only in the presence of said second signal; said first and second plurality of elements cooperating with said visual display means to provide an incremental display whenever a first and second actuating pulse coincide in respective elements of said first and second plurality of elements.

6. The combination of claim 2 in which said large-area display means is an endless belt of dielectric material; in which said elements respectively cooperate with said belt to form incremental electrostatic charges thereon in dot form responsive to actuation; in which said elements are stationary and said belt is moved transversely with respect thereto; and further comprising means for applying charged toner material to said belt following said elements whereby said visual display is provided.

References Cited in the file of this patent

UNITED STATES PATENTS

| | | |
|---|---|---|
| 2,762,862 | Bliss | Sept. 11, 1956 |
| 2,840,304 | Williams et al. | June 24, 1958 |
| 2,916,727 | Jones | Dec. 8, 1959 |